Dec. 8, 1970  L. H. SMITH ET AL  3,545,292
POSTAL FRANKING MACHINE

Filed Aug. 7, 1968  6 Sheets-Sheet 1

INVENTORS
LESLIE HARROLD SMITH
PETER JOHN MACLEOD
BY Hancock, Downing
& Seebold ATTORNEYS Dec. 8, 1970     L. H. SMITH ET AL     3,545,292

POSTAL FRANKING MACHINE

Filed Aug. 7, 1968     6 Sheets-Sheet 3

INVENTORS
LESLIE HARROLD SMITH
PETER JOHN MACLEOD
BY

ATTORNEYS

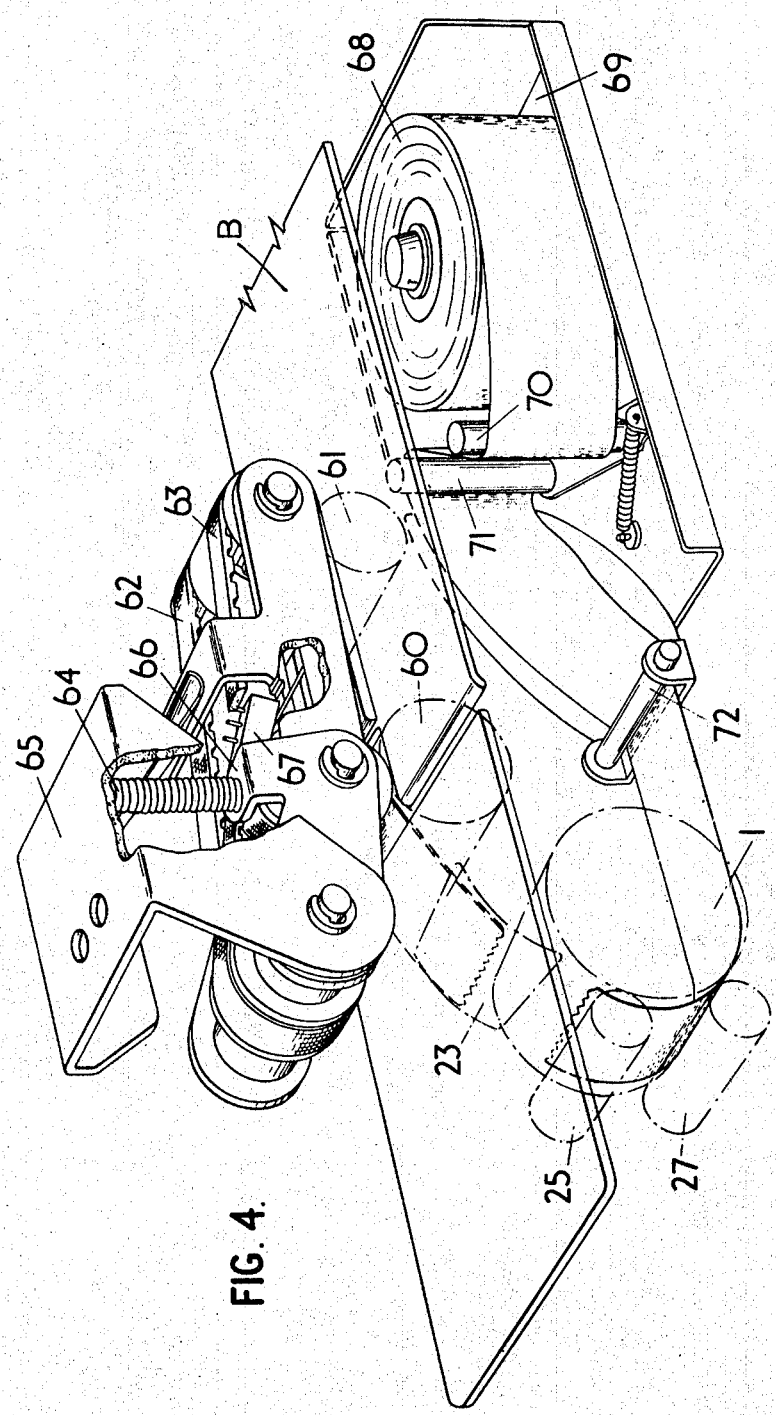

Dec. 8, 1970  L. H. SMITH ET AL  3,545,292

POSTAL FRANKING MACHINE

Filed Aug. 7, 1968  6 Sheets-Sheet 5

INVENTORS
LESLIE HARROLD SMITH
PETER JOHN MACLEOD
BY

ATTORNEYS

Dec. 8, 1970  L. H. SMITH ET AL  3,545,292

POSTAL FRANKING MACHINE

Filed Aug. 7, 1968  6 Sheets-Sheet 6

INVENTORS

LESLIE HARROLD SMITH
PETER JOHN MACLEOD

BY

ATTORNEYS

United States Patent Office 3,545,292
Patented Dec. 8, 1970

3,545,292
POSTAL FRANKING MACHINE
Leslie Harrold Smith, Romford, and Peter John MacLeod, Letchworth, England, assignors to Roneo Limited, Croydon, England, a British company
Filed Aug. 7, 1968, Ser. No. 750,876
Claims priority, application Great Britain, Aug. 17, 1967, 37,992/67
Int. Cl. F16h 27/00
U.S. Cl. 74—142                                10 Claims

ABSTRACT OF THE DISCLOSURE

A dog clutch, preferably for use in a franking machine, having a plurality of pawls upon a driven member, each pawl being movable under the action of a spring to engage ratchet teeth upon a driving member, the ratchet teeth being of equal pitch while the pawls are unevenly spaced in a circumferential direction, so that only one of the pawls drivingly engages a tooth at any relatively rotational positioning of the driving and driven members. When there are four pawls, the circumferential difference between the spacing between the pawls is equal to ¼ of the pitch of the teeth on the driving member. The clutch may have a pawl control member rotatable relative to the driven member in the normal direction of rotation of the clutch, about the axis of rotation of the clutch, by the action of a spring and have cam members thereon which engage the pawls and withdraw them radially from the ratchet teeth when the pawl control member is rotated against the action of the spring.

---

The invention relates to franking machines of the kind which, besides being capable of franking envelopes, is adapted to provide printed labels for attachment to postal packets which cannot be inserted into the machine for franking in the normal way, while the object of the invention is to provide a franking machine of the kind above referred to, which is positive in action, and is more reliable in use than machines heretofore proposed.

The invention consists in a dog clutch having a plurality of pawls upon a driven member each of which is movable under the action of a spring to engage ratchet teeth upon a driving member characterized in that the ratchet teeth are of equal pitch while the pawls are unevenly spaced in a circumferential direction, so that only one of the pawls drivingly engages a tooth at any relatively rotational positioning of the driving and driven members.

The invention further consists in a dog clutch as set forth in the preceding paragraph in which there are four pawls and the circumferential difference between the spacing between the pawls is equal to ¼ of the pitch of the teeth on the driving member.

The invention still further consists in a dog clutch as set forth above having a pawl control member rotatable relative to the driven member in the normal direction of rotation of the clutch about the axis of rotation of the clutch by the action of the spring, and having cam members thereon which engage the pawls and withdraw them radially from the ratchet teeth when the pawl control member is rotated against the action of the spring.

The accompanying drawings show, by way of example only, one embodiment of the invention in which:

FIGS. 1–4 are perspective views of the various parts constituting the label paper feed mechanism, and slogan control and interlock;

FIG. 5a is an exploded view illustrating the components of the clutch of FIG. 5;

Figure 8:
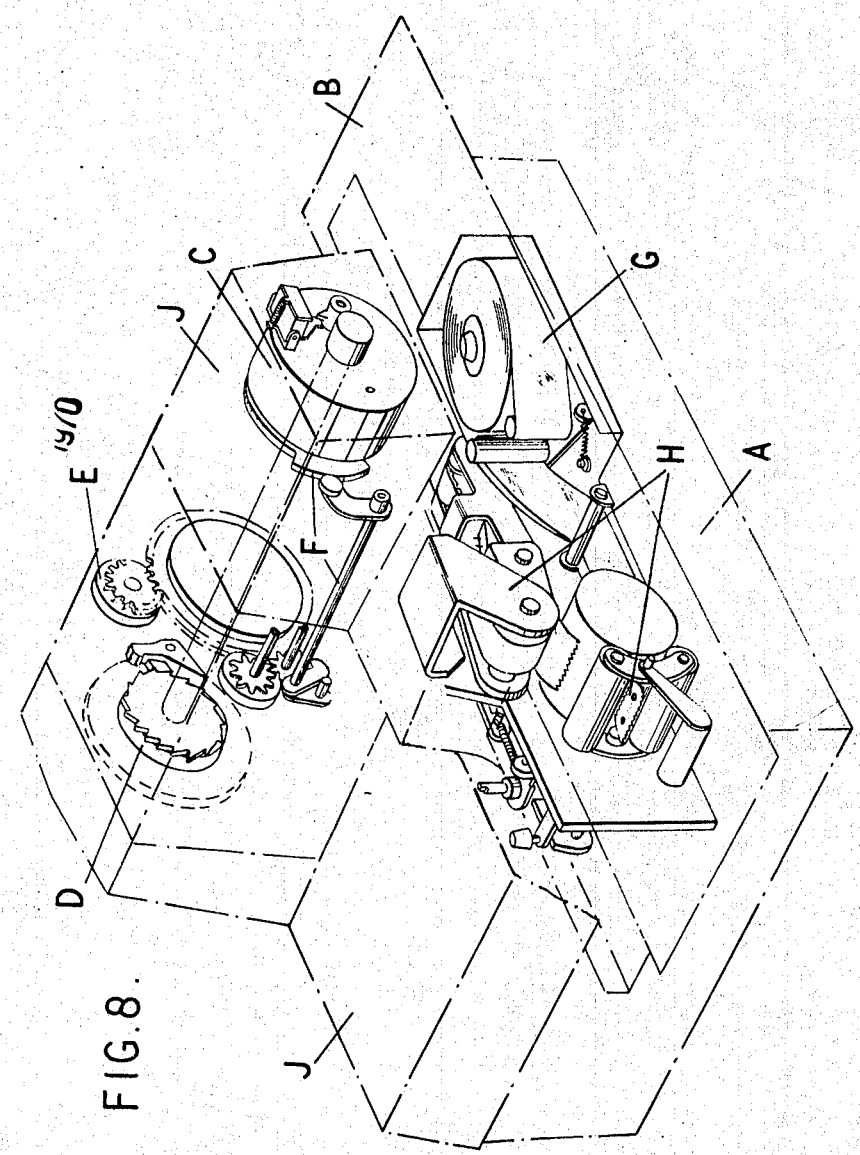
FIG. 8 is a general perspective view of the machine showing the relationship of the mechanisms shown in FIGS. 1 to 7.

It may be seen from FIG. 8 that the machine comprises a hollow box like base member A which forms a common support for the internal mechanisms of the machine. There is provided a horizontal plate B, upon which, at the nearer end, the piece of mail to be franked is placed, and along which it is conveyed to pass under a printing head C.

The printing head C is driven by an electric motor, (not shown) below a clutch D, and connected thereto by a gear drive. The motor runs continuously and the drive is initiated by the clutch D during each cycle of operation.

The value to which the printing wheels in the head C are selected by means of selector wheels, of which one E is shown.

To ensure that the total of the values printed are correct and no errors can be introduced, the register meter is locked by means of a pawl and cam mechanism F.

Besides franking pieces of mail such as envelopes, the machine is adapted to print upon labels cut from a roll of paper G. The paper strip is fed to the printing head C by a feed and cutting mechanism H which is adapted to provide labels of two different lengths, and also to control the printing of a slogan or other advertising display upon each label at the choice of the operator of the machine.

The mechanism of the machine is protected by a cover J which is removable for servicing of the machine.

The features of the machine above referred to are each described in detail hereinafter with reference to respective FIGS. 1–7.

The label paper feed mechanism and the slogan control and interlock device are provided in order that one can obtain long or short labels according to the setting of a hand control, and includes means for suppressing the printing of the slogan or advertising display when short labels are selected.

Figures 1, 5A:
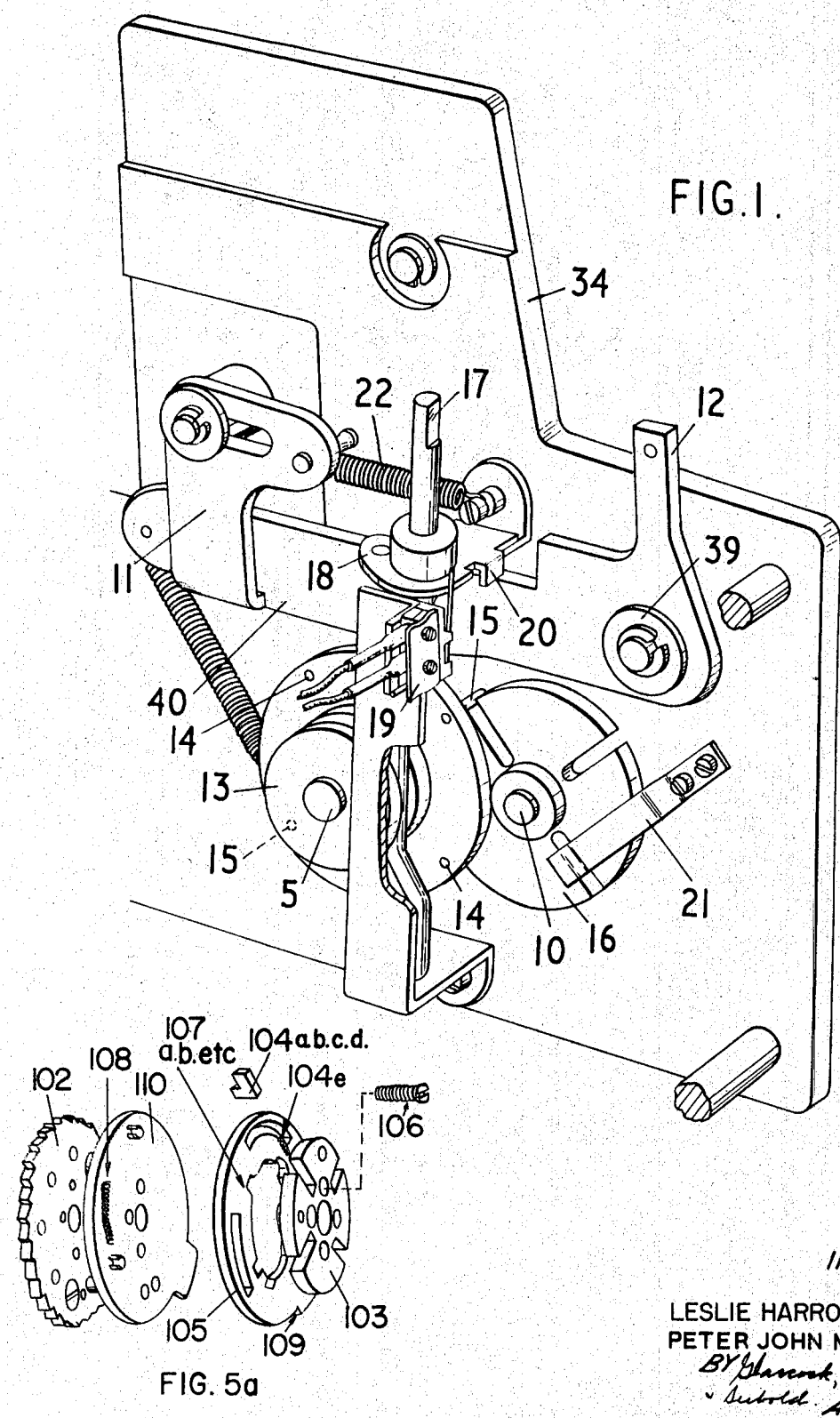
Figure 2:
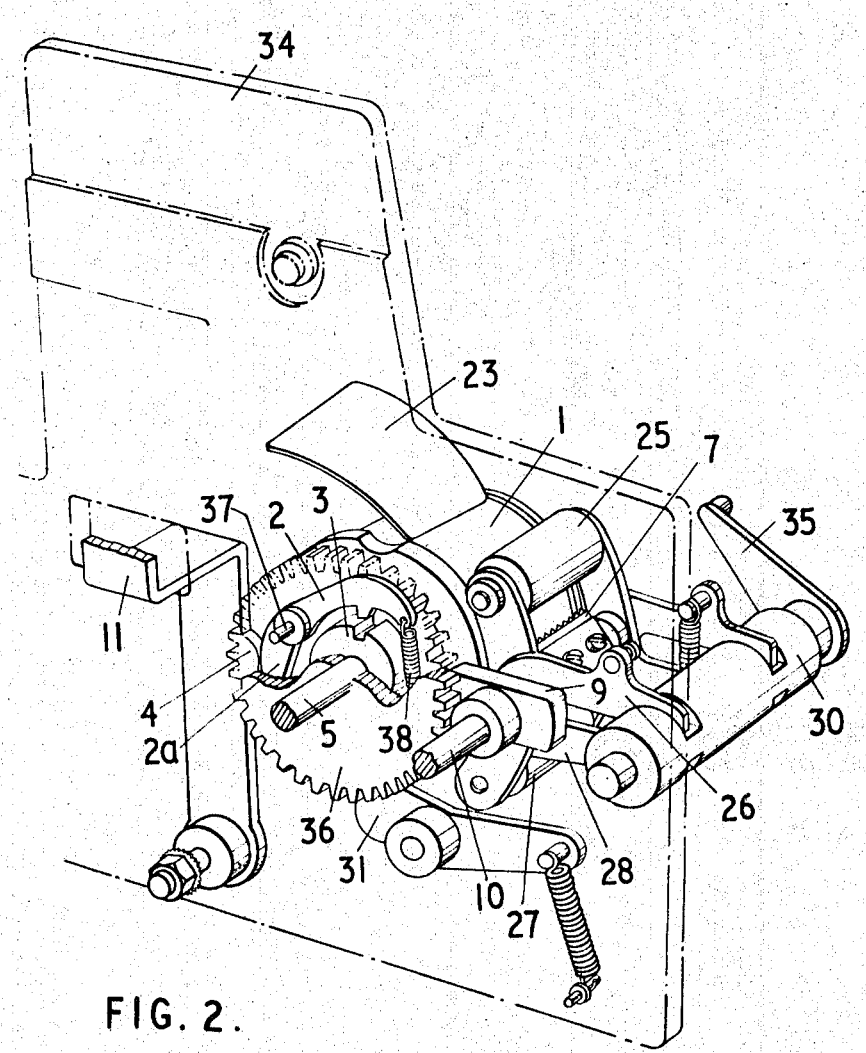

FIG. 1 shows a main bearing side frame 34 with the nearer part of the mechanism in view, and FIG. 2 shows the assembly on the other side of the main frame. A drum 1 (FIG. 2), is mounted integrally on a shaft 5, as also is a disc 3, which has two notches cut at 180°, one only of which is in view. The drum 1 is of such diameter that its periphery is equal to the length of a long label. Half of its periphery is equal to a short label. By operating a hand set lever 35, a cam shaft 30 can be rotated prising open levers 26 and 28. The bearings of pressure rollers 25 and 27 are mounted in these levers, so that the rollers are lifted clear from the drum 1 for purposes of loading the machine with paper. The free end of a roll of paper on a mounting (not shown), is threaded around the drum 1 and over a "see saw" pallet 23. The pressure of rollers 25 and 27 is then restored.

With the power switched on a gear 36 rotates continuously. A clutch sprag 2 rotates with this gear and is pivotally mounted on a stud 37 which is integral with the gear 36. The gear 36 is free to move around the shaft 5. The tooth of the sprag 2 would engage the notch in the disc 3 but for the presence of a lobe 4 on lever 11. The top end of lever 11 passes through the side frame 34 (FIG. 1), having a slotted hole and a strong spring 22 urges it to the right hand of the figure as shown. A spring 38 (FIG. 2), is not strong enough to overcome the pressure existing at the lobe 4, so that the tooth on sprag 2 will "jump" or ride clear of the notch in disc 3. Similarly, the presence of a double lobed cam 9 on shaft 10 prevents engagement of the sprag in the second and 180 opposite notch. No drive will therefore be transferred to the drum shaft 5.

Drum shaft 5 comes through a disc 13 with a grooved hub which is capable of being moved laterally to and fro having a key (not shown), which engages with a slot in the shaft 5. The disc 13 therefore revolves with the drum 1 and shaft 5. Disc 13 has four pins, two long ones 15, one not being visible, and two short ones 14. These pins 14 and 15 engage in radial slots in a Geneva wheel 16. The Geneva wheel 16 is fixed to the shaft 10, which is integral with cam 9 (see FIG. 2), and knife assembly 7.

The knife assembly 7 has a double edged blade with sharp V shaped points at two opposite 180° apart. The drum 1 has two inserts which have V grooves exactly complementary to the knife serrations. These two inserts are locked into drum 1, but have springs underneath urging them outwardly. The knife blade is of such a size as to interfere slightly piercing the label paper to the maximum extent. Damage to the insert is avoided because of the give in the spring insert.

The axial position of disc 13 is determined by the cranked rod 17 which has a hand controlled knob (not shown). Plate 18 is integral with rod 17 and has a lug 20 which is inoperative in the position shown. This position is the "long" label position with microswich 19 inoperative, and the disc 13 at its furthermost throw forwards away from the Geneva wheel 16. In this position short pins 14 cannot engage in the slots of the Geneva wheel 16.

The action which occurs on the demanding of a "long" label is as follows:

Slide 12 (FIG. 1), has a slotted hole behind washer 39. The slide can therefore be moved by hand operation to the left by a thumb knob (not shown), the stepped end at 40 also carrying lever 11 to the left. Lobe 4 (FIG. 2), ceases to influence sprag 2 which now engages disc 3 and rotates the shaft 5 with the drum 1 in a counter-clockwise direction. After 90° only of revolution, the pin 15 (FIG. 1), on the underside of disc 13 approaches one of the radial slots in the Geneva wheel 16.

During the next 90° of revolution Geneva wheel 16 is rotated also through 90°, taking with it shaft 10, cam 9 and the knife blade assembly 7. By virtue of the cam 9 rotating in a clockwise direction, it clears lobe 2A of sprag 2, thus allowing sprag 2 to continue driving disc 3. Should the hand operation of slide 12 have been unnecessarily prolonged, no repeat can occur while slide 12 is raised clear of lever 11 by the action of pins 15 as they revolve with disc 13.

The drum 1, shaft 5 and disc 13 continue to rotate until sprag 2 has again become engaged by the restored presence of lobe 4 and lever 11. During the last 90° revolution, the pin 15 (FIG. 1), will have passed through the Geneva wheel 16 causing knife 7 (FIG. 2), to become engaged with the paper and the insert in drum 1. The paper becomes perforated severely, but not quite separated. At the moment of piercing, the leading edge of the paper has entered the first feed rolls of the printing head feed (not shown), and is pulled tightly over the pallet 23 (FIGS. 2 and 4). This member is mounted on a single shouldered stud which is offset, so that when the paper tightens over it, it "see saws" thereby one side. This occurs when the perforation passes over it, thus triggering off a tear, which is then easily completed by the tug of the feed rolls.

Figure 3:
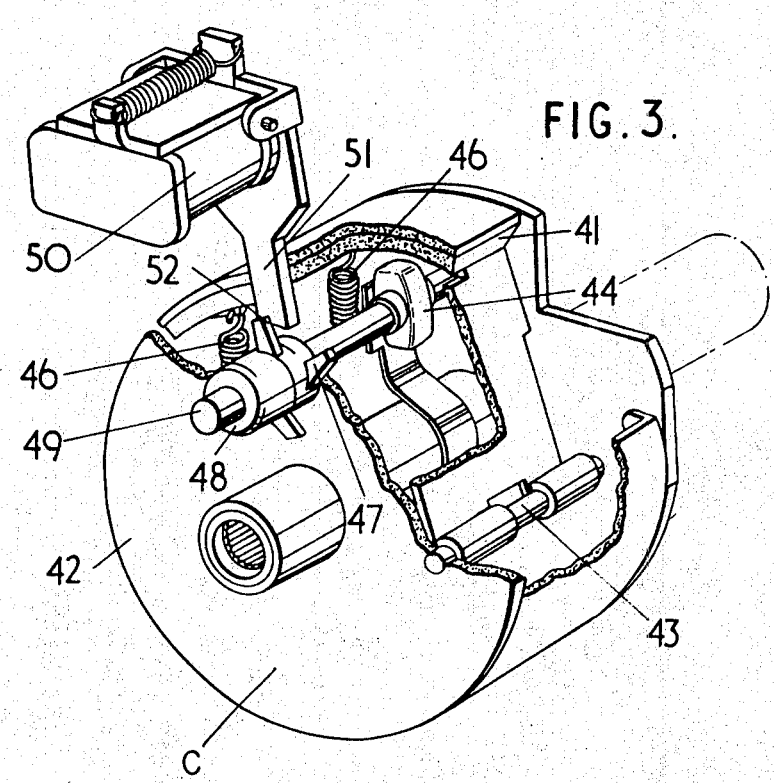

The paper thus is separated before it passes under the franking head. The length of paper is equal to the total circumference of the drum 1. In this setting it is assumed that a slogan or display is to be printed. Feed rolls 60 and 61 carry the label forward to the printing drum head, and have above them, as shown in FIG. 4, flexible pressure bands 62 and 63, which are pressed downwardly by spring 64 between support bracket 65 and carriage 66. The rotation of the printing drum head is initiated by the contacting of the arm of switch 67, either by a label, when these are being used, or by an envelope when it is inserted into the pinch of the roll 60. Roll 68 of paper strip is housed in a means 69 in the side of the machine, and passes over guide pins 70, 71 and 72 and thence around the feed drum 1 as previously described. The method of demanding the slogan printing automatically is now described:

In FIG. 3 is seen the part of a printing drum head 42 with a slogan die carrier 41. The carrier 41 is pivoted at 43, and its underside rides on cam 44, mounted on shaft 49, while also on shaft 49 are two wheels 47 and 48, each having two teeth projecting at 180° opposite. These wheels are set at 90° to one another. As previously mentioned in the description relating to FIG. 1 for demanding a "long" label, the plate 18 and the lug 20 do not close the microswitch 19. Therefore, the electrical circuit is not closed and electro-magnet 50 (FIG. 3), is not energized. The armature therefore is at rest in the position shown.

When the printing head is operated, it revolves counter-clockwise. The lower extremity of armature 51 lays in the path of wheel 47, and as it sweeps past it will be revolved in a clockwise direction, turning shaft 49 through 90° raising the slogan die carrier 41 by means of the cam 44. This is retained by springs 46. The die (not shown), mounted on the carrier, is now in its raised or printing position, and will remain so, during further cycles of operation, because the tooth of wheel 47 is over to the right hand. Also, because the shaft 49 has been moved through 90° the tooth 52 of nearer wheel 48 is now around in a position where it will engage the tip of armature 51 should the magnet 50 become energized.

The setting of a short label is now described in reference to FIG. 1. The control knob (not shown), is operated and turns the cranked rod 17 through 90° to bring the lug 20 around to close the microswitch 19 which causes the operation of the electro-magnet 50 (FIG. 3). The disc 13 (FIG. 1), moves nearer to the Geneva wheel 16. The short pins 14 now operate in the radial slots of the Geneva wheel 16, in addition to the long pins 15. With the hand operation of slide 12 which pushes lever 11 this operates the sprag 2 (FIG. 2), after the manner previously described, and the drum 1 revolves. During the first 90° of rotation, pin 14 moves the Geneva wheel 16, shaft 10 and knife assembly 7 (FIG. 2), and also cam 9. During the next 90° of rotation the Geneva wheel 16 (FIG. 1), is again moved. The result of this repeated operation in the first 180° of revolution of drum 1 (FIG. 2), is that the cam 9 now presents a high portion in the path of sprag 2 and also the knife assembly 7 serrates the paper. Sprag 2 is disengaged from the disc 3 and drum 1 comes to rest after 180° movement only. Enough paper feed only for a short label is half the circumference of the drum 1. The paper is parted as before described. The slogan die does not print ink on the pressure rollers because the magnet armature 51, being attracted, has caused wheel 48 to turn shaft 49 and cam 44 back to low position.

In FIG. 1 detent spring member 21 retains the Geneva wheel 16, so that it remains in the true position for the entry of the pins 14 and 15. The plate 18 is so shaped that the slide 12 can only be operated in the correct settings of shaft 17. Detent member 31 retains drum 1 and shaft 5 in the true at rest position and avoids overthrow when the sprag 2 is disengaged.

The printing head C is driven by an electric motor (not shown), by way of the clutch D. The motor runs continuously while the machine is in use, and each franking process is initiated by the engagement of the clutch D. The clutch is operated remotely, and it is of vital importance that the printing and recording head should make one revolution and that it should be arrested at a precisely predetermined position, and be prevented from rotating further until demanded to do so by the remote control.

Figure 5:
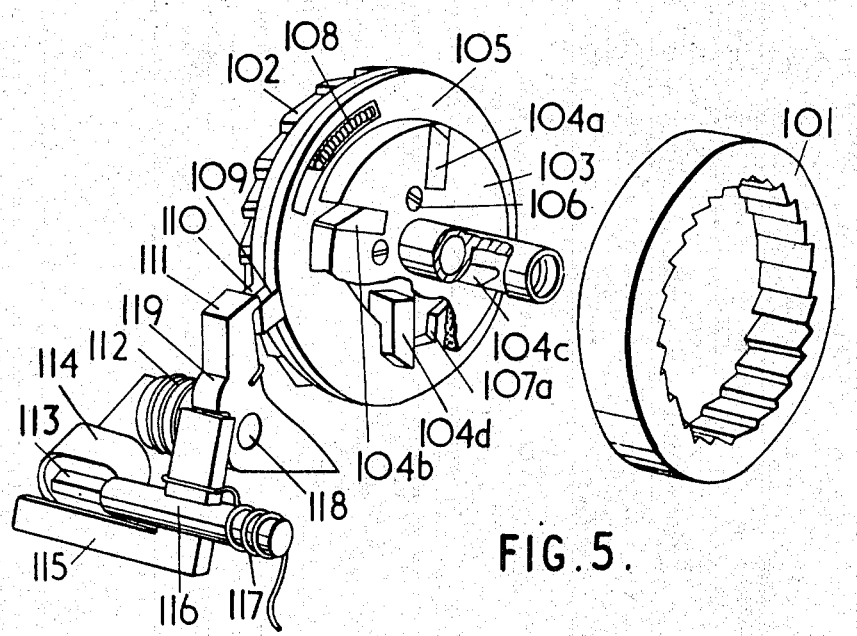
FIG. 5 is a perspective view of the clutch with the outer ring removed for clarity.

Details of the clutch are shown in FIG. 5 in which the outer toothed ring 101 is shown separated, so that the pawl mechanism housing may be clearly seen. The outer ring 101 is driven continuously by the electric motor and fits freely over a pawl housing 103 which contains and retains four driving pawls 104a, 104b, 104c and 104d, each of which is urged in an outwardly direction by a spring 104e under each pawl one of which is illustrated in FIG. 5a. Screws 106 secure pawl housing 103 to a drive plate 102, and also secure pawl housing 103 and drive plate 102 to the end face of a printing/recording head shaft (not shown), which is required to make only one revolution before being arrested by means of projections 109 and 110 being caught under hooked end of pawl 111.

A pawl control plate 105 is located between pawl housing 103 and the drive plate 102, and is free to move radially by a predetermined amount, in relation to drive plate 102 and pawl housing 103. Pawl control plate 105 is cut away internally to provide four internal cam faces 107a, 107b, 107c and 107d, of which only the first can be seen, each of which engages a projection provided on the inner face on the four driving pawls 104a, 104b, 104c and 104d retained in the slots in the pawl housing 103.

A trigger stop 111 is pivoted on a shaft 118 and the hooked end of this trigger stop is urged away from the clutch components 102, 103, and 105 by a torsion spring 112.

When the shaft to which the pawl housing 103 and drive plate 102 are rigidly attached, is required to make one revolution, an electric current passing through a coil 114 energizes magnet 113, which then attracts the horizontal portion of armature 115, pivoted on shaft 116, thereby withdrawing the top end of the vertical portion of armature 115 from under a projection 119 on trigger stop 111.

When the top end of armature 115 is withdrawn from under the projection 119 on trigger stop 111, torsion spring 112 causes the hooked end of trigger stop 111 to move away from the projection 109 on pawl housing 103 and the projection 110 on drive plate 102.

One end of spring 108 is secured to pawl plate 105, and the other end of the spring is secured to drive plate 102. When the hooked end of the trigger stop 111 is withdrawn from projection 109 and projection 110, spring 108 causes pawl plate 105 to rotate in a clockwise direction to the limit provided by an internal stop, and the internal cam faces 107a, 107b, 107c and 107d, in pawl control plate 105 permit the four driving pawls 104a, 104b, 104c and 104d to be urged upwardly and outwardly, each by its own spring (not shown), against the inner toothed bore of outer ring 101.

The pawls 104a, 104b, 104c and 104d, are unequally spaced around pawl plate 103, and are positioned in such a manner that only one of the four pawls 104a, 104b, 104c and 104d, can locate against any one of the internal ratchet teeth in the outer ring 101.

The pawls are spaced so that the radial difference between each pawl is equal to ¼ of the pitch of the internal teeth in outer ring 101. If, therefore, one pawl just misses contact with the radial face of any one of the internal teeth in outer ring 101, the next pawl will engage ¼ of a pitch of the internal teeth in the outer ring 101 later.

When any one of the pawls 104a, 104b, 104c, and 104d engage in any one of the internal teeth in outer ring 101, the constantly rotating outer ring 101 drives the printing head via one of the pawls and causes the printing head to rotate.

When the hooked end of trigger stop 111 is withdrawn from projections 109 and 110, the pointed end of trigger stop 111 is advanced towards the peripheries of pawl control plate 105 and the drive plate 102, the pointed end of trigger stop 111 advances to within an appropriate distance such that when during the rotation of the printing head the projections 109 and 110 impinge on the pointed end of trigger stop 111, the projections 109 and 110 cause trigger stop 111 to partially rotate around its spindle 118, and cause hooked end of trigger stop 111 to be placed in the path of projections 109 and 110.

The vertical portion of armature 115 is urged by torsion spring 117 against the projection 119 of trigger stop 111. When the hooked end of trigger stop 111 is urged inwards by projections 109 and 110, pushing the tail end of trigger stop 111 forward, the extreme end of the vertical portion of armature 115 is able to move under projection 119, on the back face of trigger stop 111, and hold this component in such a position that the hooked end trigger stop 111 is held firmly in the path of the rotating projections 109 and 110.

At the commencement of rotation of the printing drum/recording shaft, projection 109 has been moved radially out of line in respect of projection 110 by spring 108 rotating by a small amount, pawl plate 105, in respect of drive plate 102, therefore, projection 109 reaches the underside of the hooked end of trigger stop 111 in advance of projection 110 on drive plate 102, and when projection 109 meets the undersurface of the hooked end of trigger stop 111, it is arrested in that position, and causes the slots 104a, 104b, 104c and 104d into pawl housing 105 to be rotated out of line with slots in pawl housing 103, thereby forcing down pawls 104a, 104b, 104c and 104d into pawl housing 103, where the projecting rim of the pawl control plate 105 retains the pawls in their downward position, and out of engagement with the internal teeth in the outer ring 101. Drive plate 102 continues to rotate until the projection 110 also contacts the undersurface of the hooked end of trigger stop 111.

When the projection 110 meets the underface of the hooked end of trigger stop 111, drive plate 102 is arrested, and as this plate is rigidly attached to the printing head shaft, the printing head is also arrested in a desired position. When the printing head and drive plate 102 are arrested by the underface of the hooked end of trigger stop 111, a pawl (not shown), engages in one of the teeth in the periphery of the drive plate 102 and prevents the drive plate rotating in an anti-clockwise direction.

Figure 6:
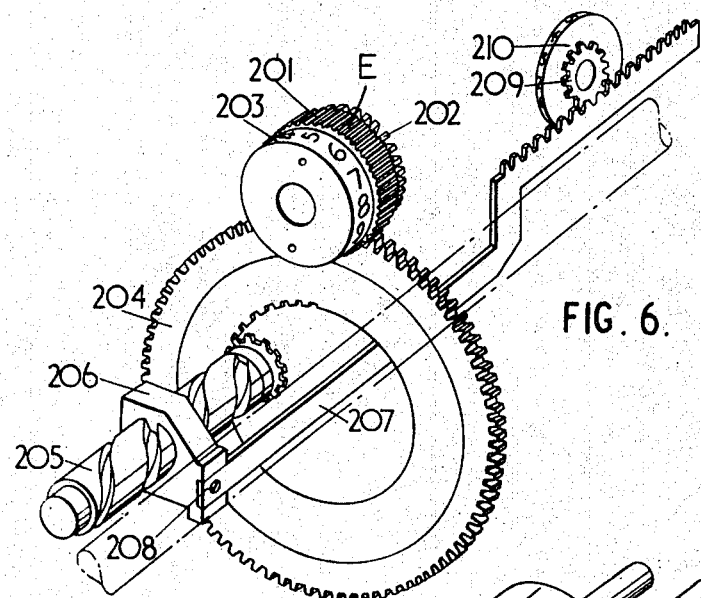
FIG. 6 is a perspective view of the value change mechanism.

FIG. 6 shows the mechanism for changing the position of the printing wheel within the printing head C with change of setting of the value required to be printed by means of selector wheel 201, of which only one is shown in FIG. 6, while in fact one is provided for each printing wheel, each operated by a similar mechanism.

When a value selecting wheel 201 is rotated by an appropriate amount, to change the value to be printed upon a piece of mail passed through the machine, printing wheel 210 prints a value identical with the number selected. It will be observed that the value selector wheel 201 and the printing wheel 210 rotate about axes which are at right angles to one another.

The value selecting wheel 201, which has on one face a pinion 202 and on the other face a projecting drum on the periphery of which are numerals indicating values required to be printed, is one of a number of wheels mounted coaxially with one another, and each meshes with the teeth on the periphery of a disc 204, coaxial with one another, and rotates it by an appropriate amount. Each disc 204 engages its internal teeth with a gear on the end of a screw 205 provided with one or more coarse helical grooves.

A nut 206 with a corresponding thread is located on the screw 205, and moves along the latter with rotation of the value selecting wheel 201. There is a screw 205 for each wheel 201 and disc 204, which are spaced circumferentially around the axis of the disc 204 and each nut 206 carries a rack 207 attached thereto by screw 208, and engages pinion 209 of the printing wheel 210. All the printing wheels are on the same axis.

The gear ratio of pinions 202, discs 204, screws 205, and toothed ends of the racks 207 and pinions 209, are so chosen that when the value selecting wheel 201 is moved a certain amount, the printing wheels 210 rotate a correspinding amount precisely related to the amount of rotation of the value selecting wheels 201.

One or more of the mechanisms illustrated in FIG. 6 may be used in each postal franking machine allowing a plurality of value selecting wheels 201 to be used independently or collectively to operate one or a plurality of printing wheels 210.

Figure 7:
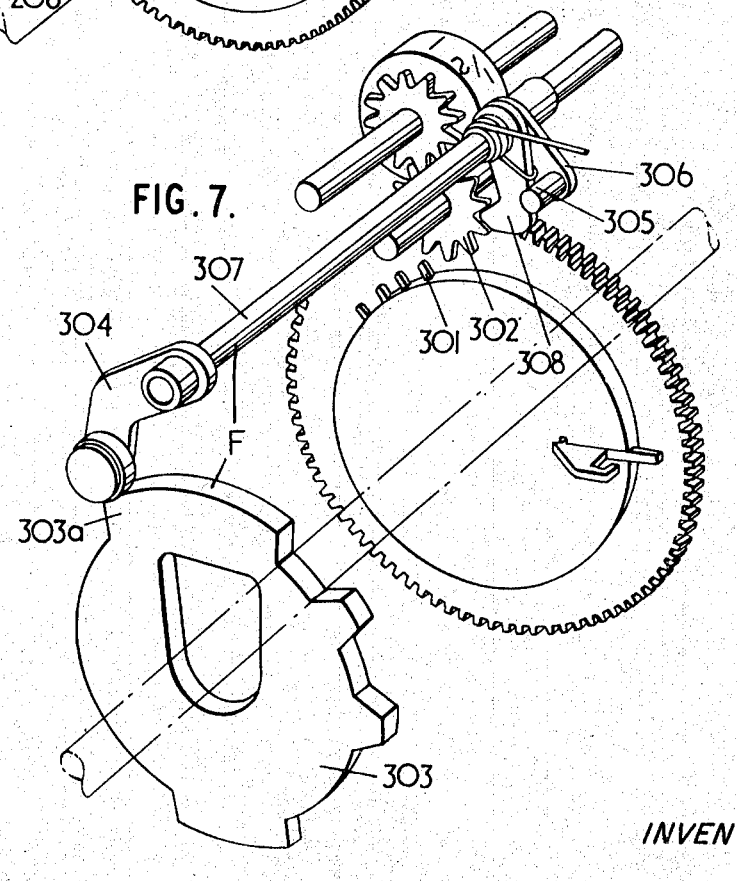
FIG. 7 is a perspective view of the meter locking means.

In FIG. 7 there is shown a locking mechanism associated with the register meter, which indicates the total value which has been printed by a machine, and is provided in order to prevent errors in the readings given. The printing head is provided in known manner with a toothed wheel, in which the number of teeth which project are caused to correspond to the value to which the associated printing wheel is set. For example, in FIG. 7 there are four teeth projecting, of which the last tooth is tooth 301. Consequently, when the printing head is rotated in an anti-clockwise direction during the franking process inter-gear 302 is moved four teeth, the tooth 301 having just left the inter-gear 302. The inter-gear 302 engages the gear beside the numbered drum and the latter has just moved four units.

In order to prevent any overthrow taking place after the last tooth 301 has left the inter-gear 302, a disc 303 is provided with a cam 303A thereon, which engages a lever 304, fixed to shaft 307, on which there is also provided a lever 306 with a pin 305, which engages the back of pawl 308, and positively prevents further rotation of the inter-gear 302. The timing of the cam is such that the pawl 308 commences to engage between two teeth of the gear 302 before the last rising tooth 301 has left the gear 302, thus ensuring that no overthrow is possible.

It is to be understood that the above description is by way of example only and that details for carrying the invention into effect may be varied without departing from the scope of the invention claimed.

We claim:

1. A dog clutch including a driven member, a driving member having ratchet teeth, a plurality of pawls upon said driven member each of which is movable under the action of a spring to engage said ratchet teeth the improvement comprising said ratchet teeth being of equal pitch while the pawls are unevenly spaced in a circumferential direction, so that only one of the pawls drivingly engages a tooth at any relatively rotational positioning of the driving and driven members, there being four pawls and the circumferential difference between the spacing between the pawls being equal to ¼ of the pitch of the teeth on the driving member.

2. A dog clutch including a driven member, a driving member having ratchet teeth, a plurality of pawls upon said driven member each of which is movable under the action of a spring to engage said ratchet teeth, the improvement comprising said ratchet teeth being of equal pitch while the pawls are unevenly spaced in a circumferential direction, so that only one of the pawls drivingly engages a tooth at any relatively rotational positioning of the driving and driven members, a pawl control member rotatable relative to the driven member in the normal direction of rotation of the clutch about the axis of rotation of the clutch by the action of a spring, and cam members thereon which engage the pawls and withdraw them radially from the ratchet teeth when the pawl control member is rotated against the action of the spring.

3. A dog clutch including a driven member, a driving member having ratchet teeth, a plurality of pawls upon said driven member each of which is movable under the action of a spring to engage said ratchet teeth, the improvement comprising said ratchet teeth being of equal pitch while the pawls are unevenly spaced in a circumferential direction, so that only one of the pawls drivingly engages a tooth at any relatively rotational positioning of the driving and driven members and said driven member being provided with a ring of ratchet teeth which are engaged with a spring loaded stationary pawl to prevent counter-revolution of the clutch.

4. The dog clutch as claimed in claim 2 in which driven member and the pawl control member are each provided with a radially projecting abutment member, and there is also provided movable stop means movable into the path followed by the abutment members to engage them by the operation of which the rotation of both the driven member and the pawl control member are brought to a stop at a predetermined position, and the clutch is disengaged.

5. The dog clutch as claimed in claim 4 in which the leading faces of the abutment members on the driven member and the pawl control member are in the same radial plane when the clutch is disengaged, and a common movable stop is engaged by both abutment members when the clutch is disengaged.

6. The dog clutch as claimed in claim 5 in which at the instant the movable stop is caused to become disengaged from the abutment members to engage the clutch, the pawl control member is rotationally advanced of the driven member by the spring, and the pawls are released, and one of them becomes engaged with one of the ratchet teeth on the driving member to engage the clutch.

7. The dog clutch as claimed in claim 4 in which the movable stop means is urged to move into the disengaged position by a spring, and is held in the engaged position by a catch operated by an electro-magnetic device, the movable stop means being provided with a projection which is engaged by the radial projection on the driven member after part-revolution of the latter to bring the movable stop means into the engaging position to stop rotation of the driven member and to disengage the pawls at the completion of one revolution of the driven member.

8. The dog clutch as claimed in claim 7 in which a movable stop member is in the form of a lever hingeable intermediate its ends, the one end being formed as a hook for engaging the two radial projections, while the other end is engaged by the radial projection on the driven member to hinge the lever and move the hook into the path of the two radial projections.

9. The dog clutch as claimed in claim 7 incorporated in a franking machine, and in which the printing drum head is driven by an electric motor by way of the clutch, and the electro-magnetic device is controlled by an electric switch operated by the passage of an envelope or label through the feed mechanism to the printing drum head.

10. A dog clutch of the type adapted to make driving connection between a continuously rotating input shaft and an output shaft required to make precisely one complete revolution and only one complete revolution each time the clutch is engaged, comprising a driving member and a driven member, equally circumferentially spaced ratchet teeth on the driving member, a plurality of unequally circumferentially spaced pawls upon the driven member, each of which is movable on the action of a ratchet spring to engage the ratchet teeth, only by means of one tooth at any one time, and a pawl control member rotatable relative to the driven member in the normal direction of rotation of the clutch, about the axis of rotation of the clutch, by the action of a pawl control member spring, and having cam members thereon which engage the pawls and withdraw them radially from the ratchet wheel when the pawl control member is rotated against the action of the pawl control member spring.

References Cited

UNITED STATES PATENTS

| | | | |
|---|---|---|---|
| 2,368,892 | 2/1945 | Skoog | 192—28 |
| 2,581,323 | 1/1952 | Gottschau | 192—28 |
| 3,378,123 | 4/1968 | Papa | 192—67 |
| 3,385,407 | 5/1968 | Kleinhans et al. | 192—67 |

WESLEY S. RATLIFF, JR., Primary Examiner

U.S. Cl. X.R.

192—28, 71